US012187256B2

(12) United States Patent
Kim

(10) Patent No.: US 12,187,256 B2
(45) Date of Patent: Jan. 7, 2025

(54) APPARATUS FOR CONTROLLING ELECTRO MECHANICAL BRAKE SYSTEM AND METHOD THEREOF

(71) Applicant: HYUNDAI MOBIS CO., LTD., Seoul (KR)

(72) Inventor: Jong Sung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 179 days.

(21) Appl. No.: 18/067,092

(22) Filed: Dec. 16, 2022

(65) Prior Publication Data

US 2023/0227012 A1    Jul. 20, 2023

(30) Foreign Application Priority Data

Jan. 17, 2022   (KR) ................. 10-2022-0006552

(51) Int. Cl.
*B60T 8/172*    (2006.01)
*B60T 7/04*    (2006.01)

(52) U.S. Cl.
CPC .............. *B60T 8/172* (2013.01); *B60T 7/042* (2013.01); *B60T 2220/04* (2013.01); *B60T 2250/02* (2013.01)

(58) Field of Classification Search
None
See application file for complete search history.

(56) References Cited

U.S. PATENT DOCUMENTS

| | | | |
|---|---|---|---|
| 6,021,365 A * | 2/2000 | Ishii | B60T 8/00 303/3 |
| 2007/0262638 A1* | 11/2007 | Kodama | B60T 8/4872 303/9.62 |
| 2016/0167527 A1* | 6/2016 | Jeon | B60L 7/26 701/70 |
| 2017/0066331 A1* | 3/2017 | Jeon | B60T 8/4081 |
| 2018/0141528 A1* | 5/2018 | Oh | B60W 30/18127 |
| 2019/0381981 A1* | 12/2019 | Yoshida | B60T 8/17613 |
| 2021/0114569 A1* | 4/2021 | Yamamoto | B60W 40/11 |
| 2022/0169215 A1* | 6/2022 | Muramatsu | B60T 8/1766 |
| 2022/0194336 A1* | 6/2022 | Yamamoto | B60T 8/1766 |

FOREIGN PATENT DOCUMENTS

KR    0139517 Y1 *   4/1999
KR    10-1417863 B    7/2014

* cited by examiner

*Primary Examiner* — Justin S Lee
(74) *Attorney, Agent, or Firm* — NovoTechIP International PLLC

(57) ABSTRACT

Disclosed are an apparatus for controlling an electromechanical brake system and a method thereof. An apparatus for controlling an electromechanical brake system of the present invention includes: a brake pedal detector unit configured to detect a stepping amount of a driver; a braking module configured to brake the vehicle; a memory configured to store a slope variable braking diagram set according to a characteristic value of the vehicle; and a processor configured to calculate a braking request value based on the stepping amount input from the brake pedal detector unit, and output a control command determined by a brake distribution ratio between front and rear wheels according to the braking request value to the braking module based on the slope variable braking diagram stored in the memory.

11 Claims, 5 Drawing Sheets

APPARATUS FOR CONTROLLING ELECTRO MECHANICAL BRAKE SYSTEM AND METHOD THEREOF

CROSS-REFERENCE TO RELATED APPLICATIONS

This application claims priority from and the benefit of Korean Patent Application No. 10-2022-0006552, filed on Jan. 17, 2022, which is hereby incorporated by reference for all purposes as set forth herein.

TECHNICAL FIELD

Exemplary embodiments of the present disclosure relate to an apparatus for controlling an electromechanical brake system and a method thereof, and more particularly, to an apparatus for controlling an electromechanical brake system and a method thereof capable of adjusting a brake distribution ratio between front and rear wheels according to characteristics of the electromechanical brake system to determine a braking command capable of preventing a wheel lock situation as much as possible, thereby increasing braking efficiency, shortening a braking distance, and maximizing braking performance.

BACKGROUND

A brake system is essential for a car. A car that may not stop may not run. Therefore, for the safety of passengers, the stability of the brake system may not be overemphasized.

A vehicle's brake system is a hydraulic type, which is implemented in a way to strongly press a pad against a disk using hydraulic pressure when braking.

In addition, instead of such a hydraulic system, an electronic master booster is used to boost braking hydraulic pressure, and an anti-lock brake system (ABS) that shortens a braking distance by preventing tires from locking up during sudden braking and preventing abrupt manipulation of a steering wheel to avoid danger, an electric stability control (ESC) that stably maintains a posture of a vehicle by regulating a braking force of a vehicle and an engine output in dangerous situations such as skidding of a vehicle, and an electronic parking brake (EPB) that automatically locks a brake when a vehicle stops or when a vehicle stops to prevent the vehicle from rolling backwards when starting on a hill and automatically unlocks when a vehicle starts have been adopted.

In recent years, there is a trend to apply an electromechanical brake (EMB), an electric brake capable of implementing simplicity of configuration that the hydraulic brake system does not have and improving the reliability of braking performance.

The EMB is implemented in such a way that braking is realized by directly converting motor power into a straight moving force and pressing a pad.

As such an EMB method, there is also an electro wedge brake (EWB). The EWB is a method of implementing braking with a wedge action boosting an input by pressing a brake pad against a disk using a wedge assembly, which implements the wedge action boosting the input, that is, is actuated by an actuator, to rub the brake pad, instead of directly converting the motor power into the straight moving force.

Background art of the present invention is disclosed in Korean Patent Laid-Open Publication No. 10-1417863 (published Jul. 9, 2014, Electric Control Brake System).

SUMMARY

When determining a front and rear wheel braking command through a pedal signal, such an electromechanical brake system determines a brake distribution ratio between front and rear wheels considering both a curb vehicle weight (CVW) condition and a gross vehicle weight (GVW) condition to derive a real braking diagram and determine a braking command accordingly.

In this case, when a braking force that restrains a brake disc is greater than a braking force determined by a friction force on a road surface, wheel lock occurs. Since ABS is activated from the moment the wheel lock occurs, the brake distribution ratio between the front and rear wheels that may delay the wheel lock situation as much as possible is a braking command that may perform the most efficient braking.

FIG. 1 is a graph illustrating a general braking diagram of a vehicle, and FIG. 2 is a graph illustrating a change in the braking diagram according to a load of the vehicle.

As illustrated in FIG. 1, as a braking deceleration increases, a load moves forward, and as a result, in general, a large amount of front wheel braking force is required and a small amount of rear wheel braking force is required. Here, the brake distribution ratio between the front and rear wheels that ideally connects the front wheel braking force and the rear wheel braking force is an ideal braking curve.

Such a braking curve varies depending on a load state of a vehicle. The lightest curb vehicle state is the CVW ideal braking curve, and the heaviest load state in which passengers, luggage, and the like are loaded becomes a GVW ideal braking curve.

In addition, a red line indicates a front wheel lock limit line and a rear wheel lock limit line, respectively, when a friction coefficient of a road surface is 1.0 in the CVW condition. Theoretically, the wheel lock does not occur within the red line. In addition, a part in which each point is marked is a part where 1 g deceleration occurs in the CVW condition and a part where 1 g deceleration occurs in the GVW condition, in each ideal braking curve.

Therefore, in the general braking distribution, the brake distribution ratio between the front and rear wheels is determined according to a linear braking diagram that may pass simultaneously a point of occurrence of CVW 1 g and a point of occurrence of GVW 1 g so as to be like the blue line, which is referred to as a real braking curve.

In the hydraulic brake system, the brake distribution ratio between the front and rear wheels is difficult to vary because it is determined by cross-sectional areas of caliper pistons of the front and rear wheels, and thus is represented as a primary diagram as illustrated in FIG. 1.

As such, even if the brake distribution ratio between the front and rear wheels is determined by the primary diagram, the wheel lock does not occur when the braking is made only within the area of the front wheel lock limit line and the rear wheel lock limit line.

However, this limit line is limited to the CVW condition and the condition when the friction coefficient of the road surface is 1.0. Therefore, when the friction coefficient of the road surface such as rain or snow is low or when the load of the vehicle increases, the lock limit line moves accordingly. Considering this situation, determining the brake distribution ratio with the ideal braking curve for each condition becomes the brake distribution ratio where efficiency and performance may be maximized.

However, since a road surface is a factor that changes depending on the environment, it is difficult to accurately measure the load state of the vehicle and transmit the accurate information on the load state to the braking system, so it is difficult to select the brake distribution ratio between the front and rear wheels as the ideal braking curve and to determine the braking command.

Therefore, as a result of analyzing the braking characteristics of the vehicle in such a situation, when it is difficult to simultaneously satisfy the point of occurrence of 1 g in the CVW ideal braking curve and the point of occurrence of 1 g in the GVW ideal braking curve, the rear wheel lock situation is usually more dangerous in terms of vehicle stability than the front wheel lock situation. As a result, as the real braking curve is taken in the direction of minimizing the wheel lock situation of the rear wheel as illustrated in FIG. 2, the situation (situation in which the front wheel lock occurs) in which the ABS needs to be actuated becomes more frequent as the real braking curve is further away from the ideal braking curve in the GVW condition, so the braking efficiency decreases.

As described above, since the brake distribution ratio between the front and rear wheels may vary depending on the load condition of the vehicle, etc., it is difficult to determine the braking command considering all of these factors.

Since the brake distribution ratio between the front and rear wheels is determined according to a piston size of the front and rear wheel calipers, the hydraulic brake system has a problem in that it may perform a variable braking distribution in which the braking pressure deviates from the primary diagram.

The present disclosure has been made in an effort to provide an apparatus for controlling an electromechanical brake system and a method thereof capable of adjusting a brake distribution ratio between front and rear wheels according to characteristics of the electromechanical brake system to determine a braking command capable of preventing a wheel lock situation as much as possible, thereby increasing braking efficiency, shortening a braking distance, and maximizing braking performance.

Technical problems to be solved by the present invention are not limited to the above-mentioned technical problem(s), and other technical problem(s), which are not mentioned above, may be clearly understood by those skilled in the art from the following descriptions.

Various embodiments are directed to an apparatus for controlling an electromechanical brake system of the present invention, including: a brake pedal detector unit configured to detect a stepping amount of a driver; a braking module configured to brake the vehicle; a memory configured to store a slope variable braking diagram set according to a characteristic value of the vehicle; and a processor configured to calculate a braking request value based on the stepping amount input from the brake pedal detector unit, and output a control command determined by a brake distribution ratio between front and rear wheels according to the braking request value to the braking module based on the slope variable braking diagram stored in the memory.

The slope variable braking diagram may be a braking curve of a rear wheel braking clamping force with respect to a front wheel braking clamping force, and may be a curve connecting a first set point of an ideal braking curve based on a curb vehicle weight and a second set point of an ideal braking curve based on a gross vehicle weight from the beginning of braking.

The slope variable braking curve may increase with a first slope from an initial braking to the first set point of the ideal braking curve based on the curb vehicle weight and then increase with a second slope to the second set point of the ideal braking curve based on the gross vehicle weight.

The gross vehicle weight may be a gross vehicle state of a total weight of the vehicle.

The first set point and the second set point may be maximum deceleration/acceleration points that occur in a high friction road.

Various embodiments are directed to a method of controlling an electromechanical brake system, including: receiving, by a processor, a stepping amount from a brake pedal detector unit; calculating, by the processor, a braking request value according to the stepping amount; calculating, by the processor, the braking request value and then determining a brake distribution ratio between front and rear wheels according to the braking request value based on a slope variable braking diagram stored in a memory; and determining, by the processor, the brake distribution ratio between the front and rear wheels and then driving a braking module outputting a control command to the braking module.

The slope variable braking curve may be a braking curve of a rear wheel braking clamping force with respect to a front wheel braking clamping force, and may be a curve connecting a first set point of an ideal braking curve based on a curb vehicle weight and a second set point of an ideal braking curve based on a gross vehicle weight from the beginning of braking.

The slope variable braking curve may increase with a first slope from an initial braking to the first set point of the ideal braking curve based on the curb vehicle weight and then increase with a second slope to the second set point of the ideal braking curve based on the gross vehicle weight.

The gross vehicle weight may be a gross vehicle state of a total weight of the vehicle.

The first set point and the second set point may be maximum deceleration/acceleration points that occur in a high friction road.

An apparatus for controlling an electromechanical brake system and a method thereof capable of increasing braking efficiency may adjust a brake distribution ratio between front and rear wheels according to characteristics of the electromechanical brake system to determine a braking command capable of preventing a wheel lock situation as much as possible, thereby delaying the start of ABS as much as possible, achieving efficient braking, and maximizing braking performance.

In addition, a braking command may be determined only by a curb vehicle weight and a gross vehicle weight according to a characteristic value of a vehicle without measuring or estimating a load of the vehicle, thereby simply and easily obtaining maximum braking performance.

Meanwhile, the effects of the present disclosure are not limited to the above-mentioned effects, and various effects may be included within a range obvious to those skilled in the art from the following description.

DETAILED DESCRIPTION

Figure 1:
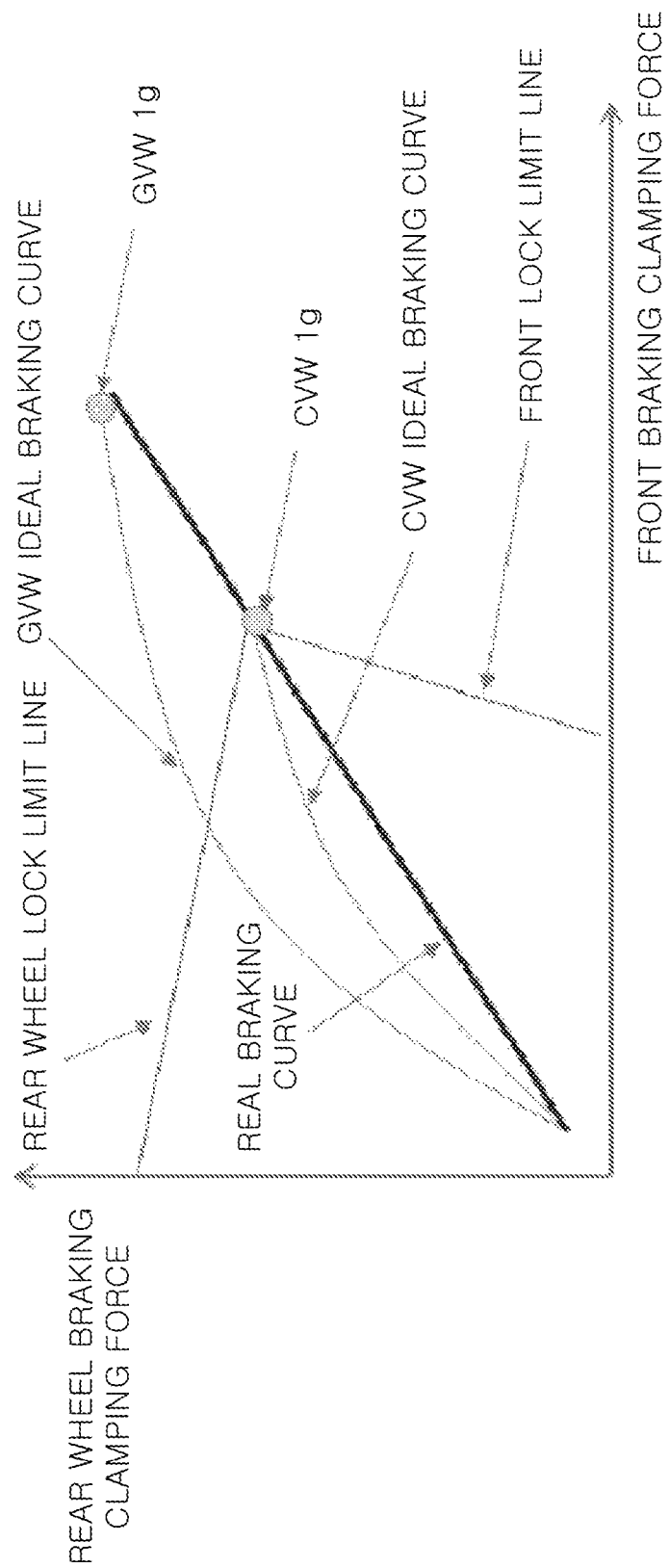
FIG. 1 is a graph illustrating a braking diagram of a general vehicle.
Figure 2:
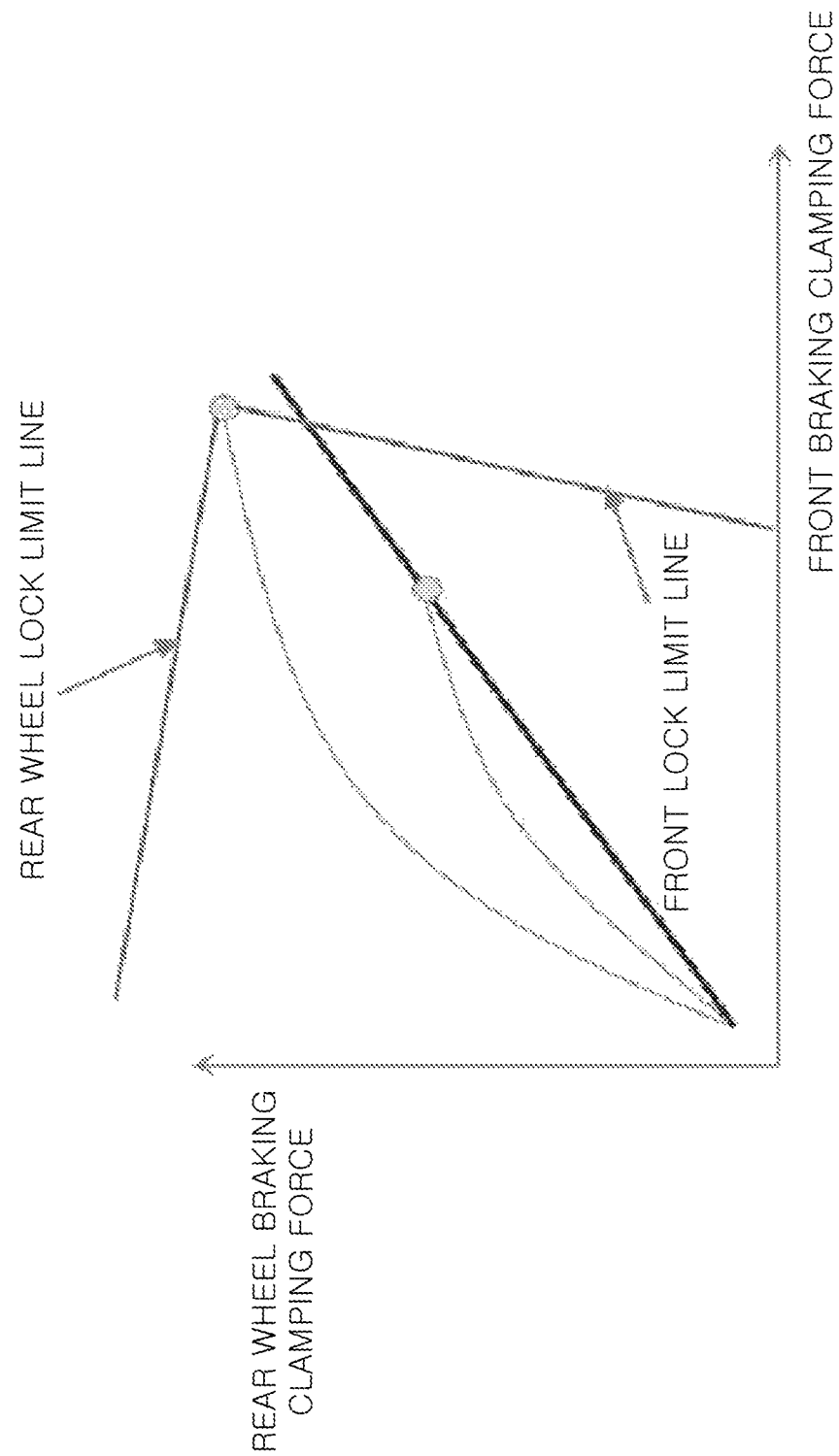
FIG. 2 is a graph illustrating a change in a braking diagram according to a load of a vehicle.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus for controlling an electromechanical brake system and a method thereof according to the present invention will be described with reference to the accompanying drawings. In this process, thicknesses of lines, sizes of components, and the like, illustrated in the accompanying drawings may be exaggerated for clearness of explanation and convenience. In addition, terms to be described below are defined in consideration of functions in the present disclosure and may be construed in different ways by the intention of users or practice. Therefore, these terms should be defined on the basis of the contents throughout the present specification.

Figure 3:
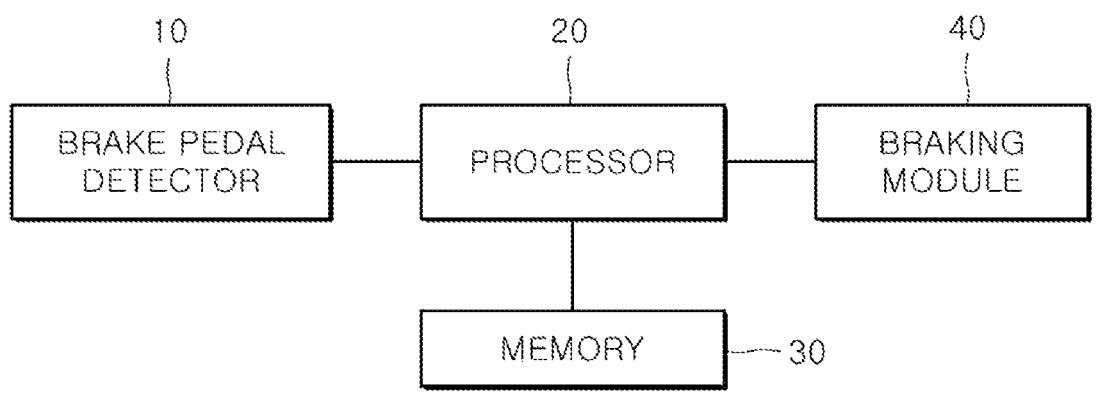
FIG. 3 is a block configuration diagram illustrating an apparatus for controlling an electromechanical brake system according to an embodiment of the present invention.
Figure 4:
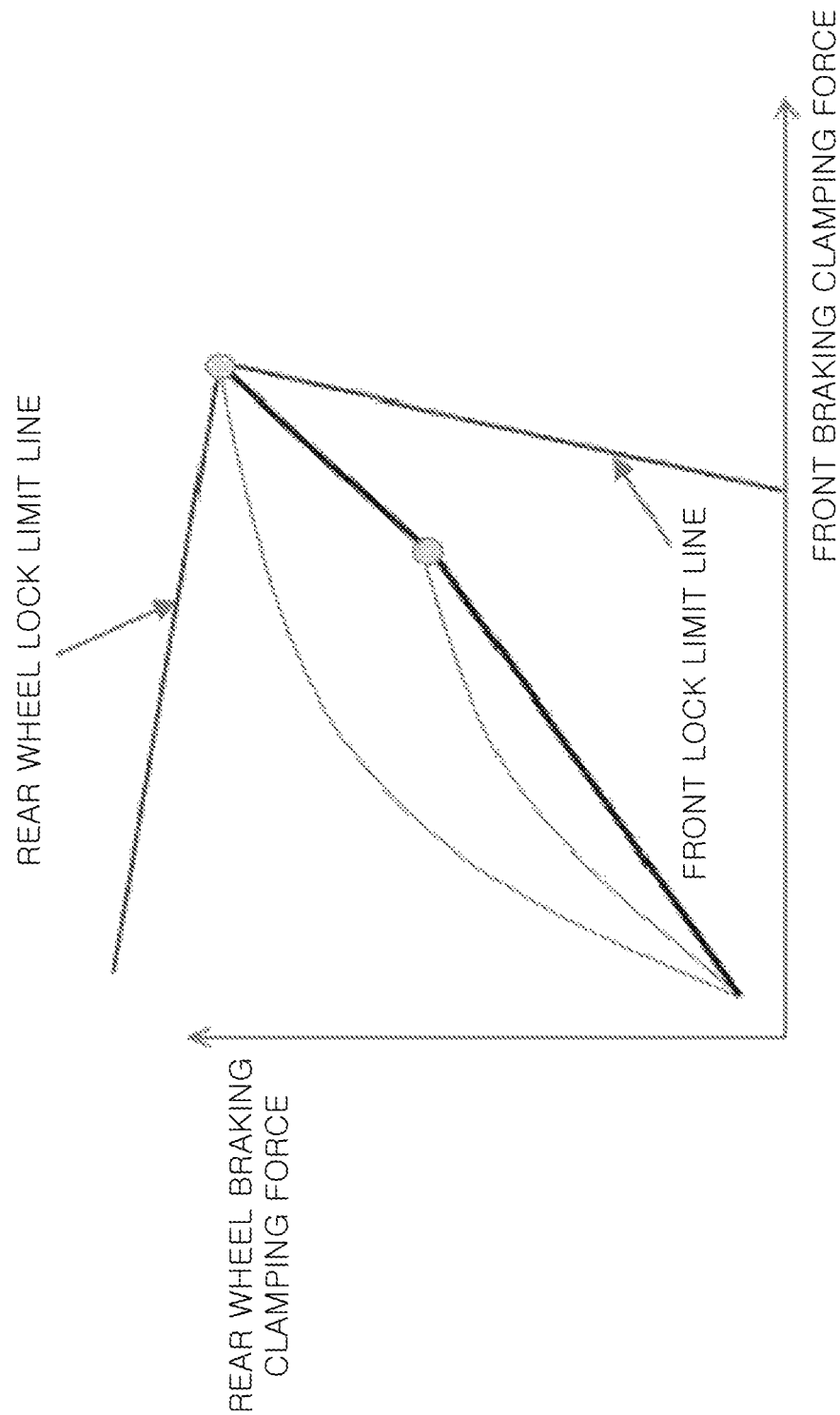
FIG. 4 is a graph illustrating a braking diagram of a vehicle according to an embodiment of the present invention.

FIG. 3 is a block configuration diagram illustrating an apparatus for controlling an electromechanical brake system according to an embodiment of the present invention, and FIG. 4 is a graph illustrating a braking diagram of a vehicle according to an embodiment of the present invention.

As illustrated in FIG. 3, an apparatus for controlling an electromechanical brake system according to an embodiment of the present invention may include a brake pedal detector unit 10, a braking module 40, a memory 30, and a processor 20.

The brake pedal detector unit 10 detects a driver's stepping amount of a brake pedal and provides the detected stepping amount to the processor 20 to determine a braking intention of the driver and calculate a braking request value.

When a stepping force of the driver is applied, the braking module 40 moves pads (not illustrated) attached to both sides of a caliper (not illustrated) forward, and presses disks (not illustrated) of wheels from both sides to generate a braking force.

The memory 30 stores slope variable braking data (e.g., slope variable braking diagram, etc.) set according to characteristic values of a vehicle.

Here, as illustrated in FIG. 4, the slope variable braking diagram is a braking curve of a rear wheel braking clamping force with respect to a front wheel braking clamping force, and is a curve connecting a first set point of an ideal braking curve based on a curb vehicle weight and a second set point of an ideal braking curve based on a gross vehicle weight from the beginning of braking or at an initial braking.

Here, the first and second set points may respectively represent maximum deceleration and acceleration points that can occur in a high friction road.

In this embodiment, a 1 g deceleration point is described as the maximum deceleration/acceleration point as an example, but considering characteristics of a tire, when a road friction coefficient of the tire is at most 1.0, the maximum deceleration/acceleration is 1 g, but deceleration of 1 g or more is possible depending on the characteristics of the tire such as a special tire.

In this case, the slope variable braking curve may increase with a first slope from an initial braking to the first set point of the ideal braking curve based on the curb vehicle weight and then increase with a second slope to the second set point of an ideal braking curve based on a gross vehicle weight.

Here, a gross vehicle weight is a gross vehicle state of a total weight of a vehicle, and is a weight including a curb vehicle weight, a maximum load capacity, and the number of passengers.

The processor 20 may calculate a braking request value based on a stepping amount input from the brake pedal detector unit 10, and may output a control command determining a brake distribution ratio between front and rear wheels corresponding to the braking request value based on the slope variable braking diagram stored in the memory 30 and drive the output control command to the braking module 40.

As described above, according to the apparatus for controlling an electromechanical brake system according to the embodiment of the present invention, by adjusting a brake distribution ratio between front and rear wheels corresponding to characteristics of the electromechanical brake system to determine a braking command capable of preventing a wheel lock situation as much as possible, it is possible to delay an ABS operation time as much as possible and achieve effective braking accordingly, maximize braking performance, and determine a braking command only by the curb vehicle weight and the gross vehicle weight according to the characteristics of the vehicle without measuring or estimating the load of the vehicle, thereby simply and easily obtaining maximum braking performance.

Figure 5:
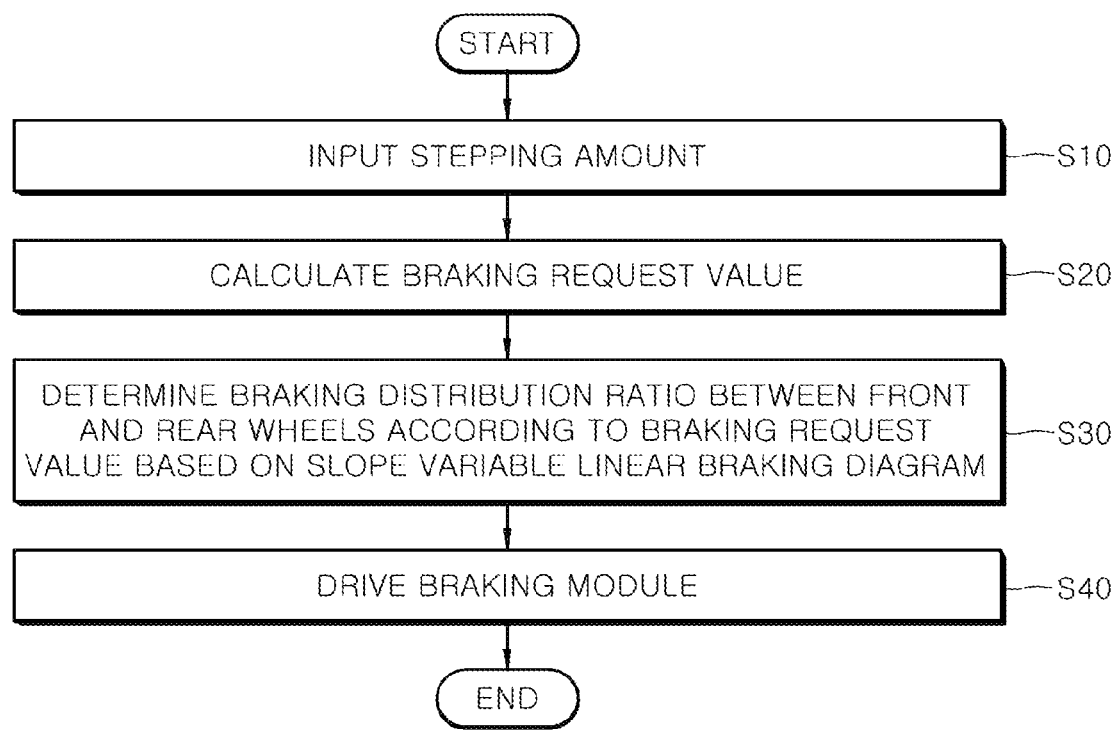
FIG. 5 is a flowchart for describing a method of controlling an electromechanical brake system according to an embodiment of the present invention.

FIG. 5 is a flowchart for describing a method of controlling an electromechanical brake system according to an embodiment of the present invention.

As illustrated in FIG. 5, in the method of controlling an electromechanical brake system according to an embodiment of the present invention, first, the processor 20 receives a stepping amount from the brake pedal detector unit 10 (S10).

After receiving the stepping amount in step S10, the processor 20 calculates a braking request value according to the stepping amount (S20).

After calculating the braking request value in step S20, the processor 20 determines the brake distribution ratio between the front and rear wheels corresponding to the braking request value based on the slope variable braking diagram stored in the memory 30 (S30).

Here, as illustrated in FIG. 4, the slope variable braking diagram is a braking curve of a rear wheel braking clamping force with respect to a front wheel braking clamping force, and is a curve connecting a first set point of an ideal braking curve based on a curb vehicle weight and a second set point of an ideal braking curve based on a gross vehicle weight from the beginning of braking.

Here, the first set point and the second set point may represent the maximum possible deceleration/acceleration points that can occur in the high friction road.

In this embodiment, a 1 g deceleration point is described as the maximum deceleration/acceleration point as an example, but considering characteristics of a tire, when a road friction coefficient of the tire is at most 1.0, the maximum deceleration/acceleration is 1 g, but deceleration of 1 g or more is possible depending on the characteristics of the tire such as a special tire.

In this case, the slope variable braking curve may increase with a first slope from an initial braking to the first set point of the ideal braking curve based on the curb vehicle weight and then increase with a second slope to the second set point of an ideal braking curve based on a gross vehicle weight.

Here, the gross vehicle weight is a gross vehicle state of a total weight of a vehicle, and is a weight including a curb vehicle weight, a maximum load capacity, and the number of passengers.

After determining the brake distribution ratio between the front and rear wheels in step S30, the processor 20 drives the braking module 40 that outputs the control command determined by the brake distribution ratio between front and rear wheels to the braking module 40 (S40).

As described above, according to the method for controlling an electromechanical brake system according to the embodiment of the present invention, by adjusting a brake distribution ratio between front and rear wheels corresponding to characteristics of the electromechanical brake system to determine a braking command capable of preventing a wheel lock situation as much as possible, it is possible to delay an ABS operation time as much as possible and achieve effective braking accordingly, maximize braking performance, and determine a braking command only by the curb vehicle weight and the gross vehicle weight according to the characteristics of the vehicle without measuring or estimating the load of the vehicle, thereby simply and easily obtaining maximum braking performance.

Implementations described herein may be implemented in, for example, a method or process, an apparatus, a software program, a data stream, or a signal. Although discussed only in the context of a single form of implementation (e.g., discussed only as a method), implementations of the discussed features may also be implemented in other forms (e.g., an apparatus or a program). The apparatus may be implemented in suitable hardware, software, firmware, and the like. A method may be implemented in an apparatus such as a processor, which generally refers to a computer, a microprocessor, an integrated circuit, a processing device including a programmable logic device, or the like. The processor also includes communication devices such as a computer, a cell phone, portable/personal digital assistants ("PDA"), and other devices that facilitate communication of information between end-users.

Although the present invention has been described with reference to embodiments illustrated in the accompanying drawings, it is only an example. It will be understood by those skilled in the art that various modifications and equivalent other exemplary embodiments are possible from the present invention.

Accordingly, a true technical scope of the present invention is to be determined by the spirit of the appended claims.

What is claimed is:

1. An apparatus for controlling an electromechanical brake system, comprising:
    a brake pedal detector unit configured to detect an amount of a driver's stepping on a brake pedal;
    a braking module configured to brake a vehicle having front and rear wheels;
    a data storage storing slope variable braking data generated based on a characteristic value of the vehicle; and
    a processor configured to:
        calculate a braking request value based on the detected stepping amount;
        determine, based on the slope variable braking data, a brake distribution ratio between the front and rear wheels corresponding to the braking request value; and
        output, to the braking module, the determined brake distribution ratio;
    wherein:
    the slope variable braking data includes a braking curve of a rear wheel braking clamping force with respect to a front wheel braking clamping force,
    the braking curve is a curve connecting a first set point of a first ideal braking curve based on a curb vehicle weight and a second set point of a second ideal braking curve based on a gross vehicle weight at an initial braking, and
    the braking curve has (1) a first portion with a first slope extending from the initial braking to the first set point of the first ideal braking curve based on the curb vehicle weight and (2) a second portion with a second slope, greater than the first slope, extending from the first set point to the second set point of the second ideal braking curve based on the gross vehicle weight.

2. The apparatus of claim 1, wherein the gross vehicle weight is a gross vehicle state of a total weight of the vehicle.

3. The apparatus of claim 1, wherein the first and second set points are respectively maximum deceleration and acceleration points that occur in a high friction road.

4. The apparatus of claim 1, the processor further delaying operation of an Automatic Braking System (ABS) based on the determined brake distribution ratio.

5. The apparatus of claim 1, wherein the second set point is located at an intersection of a rear wheel lock limit line and a front wheel lock limit line of the slope variable braking data.

6. A method of operating an electromechanical brake system, comprising:
    receiving an amount of a driver's stepping on a brake pedal of a vehicle, the vehicle having front and rear wheels;
    calculating, based on the received stepping amount, a braking request value;
    determining, based on slope variable braking data generated based on a characteristic value of the vehicle, a brake distribution ratio between the front and rear wheels corresponding to the braking request value; and
    outputting, to a braking module of the vehicle, the determined brake distribution ratio;
    wherein:
    the slope variable braking data includes a braking curve of a rear wheel braking clamping force with respect to a front wheel braking clamping force,
    the braking curve is a curve connecting a first set point of a first ideal braking curve based on a curb vehicle weight and a second set point of a second ideal braking curve based on a gross vehicle weight at an initial braking, and the braking curve has (1) a first portion with a first slope extending from the initial braking to the first set point of the first ideal braking curve based on the curb vehicle weight and (2) a second portion with a second slope, greater than the first slope, extending from the first set point to the second set point of the second ideal braking curve based on the gross vehicle weight.

7. The method of claim 6, wherein the gross vehicle weight is a gross vehicle state of a total weight of the vehicle.

8. The method of claim 6, wherein the first and second set points are respectively maximum deceleration and acceleration points that occur in a high friction road.

9. The method of claim 6, further comprising delaying operation of an Automatic Braking System (ABS) based on the determined brake distribution ratio.

10. The method of claim 6, wherein the second set point is located at an intersection of a rear wheel lock limit line and a front wheel lock limit line of the slope variable braking data.

11. An apparatus for controlling an electromechanical brake system, comprising:
- a brake pedal detector unit configured to detect an amount of force applied by a driver stepping on a brake pedal;
- a braking module configured to brake a vehicle having front and rear wheels;
- a data storage storing slope variable braking data generated based on a characteristic value of the vehicle; and
- a processor configured to:
  - calculate a braking request value based on the detected stepping amount;
  - determine, based on the slope variable braking data, a brake distribution ratio between the front and rear wheels corresponding to the braking request value; and
  - drive the braking module to brake the vehicle based on the determined brake distribution ratio;

wherein:
- the slope variable braking data includes a braking curve of a rear wheel braking clamping force with respect to a front wheel braking clamping force,
- the braking curve is a curve connecting a first set point of a first ideal braking curve based on a curb vehicle weight and a second set point of a second ideal braking curve based on a gross vehicle weight at an initial braking,
- the braking curve has (1) a first portion with a first slope extending from the initial braking to the first set point of the first ideal braking curve based on the curb vehicle weight and (2) a second portion with a second slope, greater than the first slope, extending from the first set point to the second set point of the second ideal braking curve based on the gross vehicle weight, and
- the second set point is located at an intersection of a rear wheel lock limit line and a front wheel lock limit line of the slope variable braking data.

* * * * *